Jan. 9, 1962 G. M. RAPATA 3,015,869
PLASTIC ANCHOR MEMBER
Original Filed Aug. 11, 1954
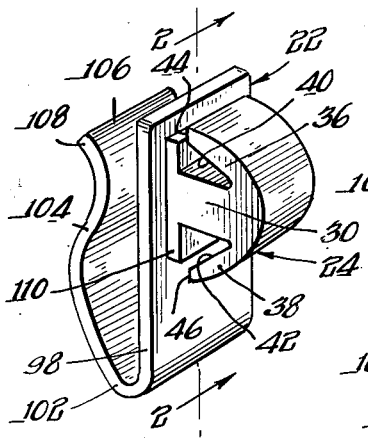
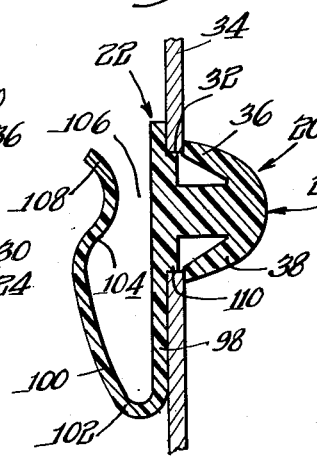
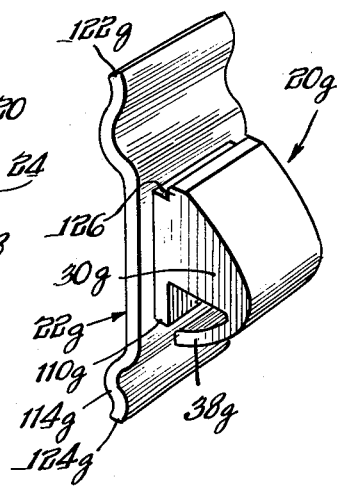
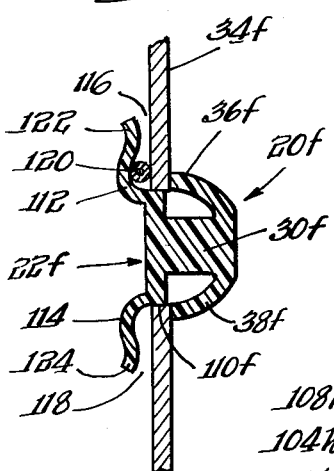
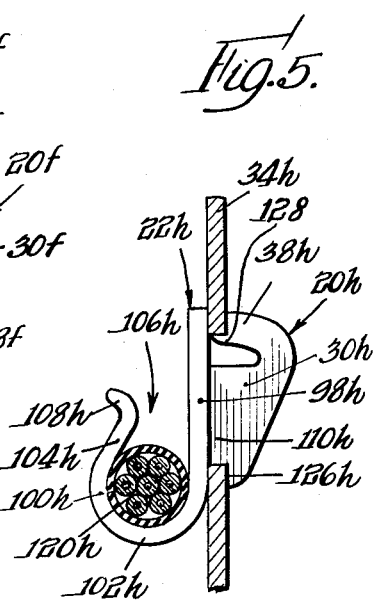
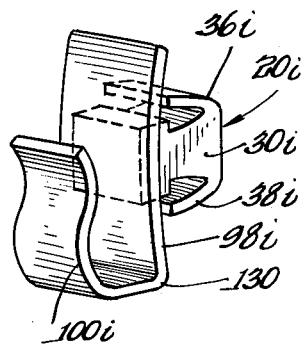
INVENTOR.
George M. Rapata
BY
Olson & Trexler
attys.

United States Patent Office 3,015,869
Patented Jan. 9, 1962

3,015,869
PLASTIC ANCHOR MEMBER
George M. Rapata, Chicago, Ill., assignor to Illinois Tool Works, Chicago, Ill., a corporation of Illinois
Original application Aug. 11, 1954, Ser. No. 449,092, now Patent No. 2,836,215, dated May 27, 1958. Divided and this application May 23, 1958, Ser. No. 737,369
9 Claims. (Cl. 24—213)

The present invention relates to novel fasteners and more particularly, to novel fasteners or anchor members for use in securing a workpiece to an apertured panel. This is a division of my copending application, Serial No. 449,092, filed August 11, 1954, now Patent No. 2,836,215, dated May 27, 1958.

The present invention contemplates a novel one piece plastic fastener or anchor member which is preferably made by a moulding process. Such heretofore known plastic fasteners have usually been adapted for use only with panels having apertures therein of a specific size and, in addition, such heretofore known fasteners have often required rather complicated moulds or dies so that manufacturing costs are unnecessarily high.

An important object of the present invention is to provide a novel one piece plastic fastener member which is adapted to be assembled through apertures of various sizes in panel members and to be securely retained in assembled relationship with such panel members.

Another object of the present invention is to provide a novel fastener member of the type set forth in the preceding paragraph, which novel fastener member is formed so as to prevent lateral shifting within larger apertures or openings through which it may be assembled.

Another important object of the present invention is to provide a novel one piece plastic fastener member which may be economically manufactured by utilizing relatively simple split die means.

Still another object of the present invention is to provide a novel one piece plastic fastener member of the above described type which is adapted to receive and lock a complementary fastener member such as a screw.

A further object of the present invention is to provide a novel one piece plastic fastener member which is adapted to clamp or retain various workpieces such as a moulding strip or an electric cable in assembled relationship with an apertured panel.

Other objects and advantages of the present invention will become apparent from the following description and the accompanying drawings wherein:

FIG. 1 is a perspective view showing a device constructed in accordance with the present invention;

FIG. 2 is a cross sectional view taken along the line 2—2 in FIG. 1 and further showing the fastener member assembled with an apertured panel;

FIG. 3 is a cross sectional view showing a fastener member embodying a modified form of the present invention assembled with an apertured panel and clamping a workpiece such as an electric cable to the panel;

FIG. 4 is a perspective view of a further modified form of the present invention;

FIG. 5 is a cross sectional view showing another modified form of a novel fastener member adapted to clamp or retain a cable; and FIG. 6 is a perspective view of a fastener member similar to the fastener member shown in FIG. 1 and incorporating a further modification.

Referring now more specifically to the drawings wherein like parts are designated by the same numerals throughout the various figures, a fastener member 20 embodying one form of the present invention is shown in FIGS. 1 and 2. The fastener member 20 as well as the other embodiments of this invention to be described below, is made of a suitable plastic material which may be flexed or deformed and which is capable of resiliency returning to its original condition before such flexing. The fastener member 20 is formed in one piece and includes a head portion 22 and a shank portion 24.

The shank 24 includes a central portion 30 extending axially from the head 22 for insertion through an aperture or opening 32 in a panel 34. Adjacent the free or entering end of the shank oppositely disposed flexible wing members 36 and 38 are integrally joined to opposite sides of the central shank portion 30. The wing members 38 and 36 extend back toward the head end of the fastener member and are flared outwardly so as to provide spaces or slots 40 and 42, respectively, between the wing members 36 and 38 and the central shank portion 30. The wing member 36 is provided with a shoulder 44 adjacent its free end for engaging the back surfaces of the panel and the wing member 38 is provided with a similar shoulder 46. As will be understood, these shoulders cooperate with head portion 22 for clamping the apertured panel and retaining the fastener member in assembled relationship with the panel.

Preferably, the shoulders 44 and 46 are inclined slightly at an angle to the axis of the fastener member and extend upwardly and outwardly so that when the shoulders are drawn tightly against the panel as shown in FIG. 2, the wing members are flared outwardly. As a result, the inherent resiliency of the wing members urges them inwardly or back to their original positions so that the wing members acting against the panel are resiliently maintained under compression and, in turn, tend to maintain the central shank portion 30 under tension.

The head portion 22 includes a relatively broad base 98 and an overlying clamping section 100 adapted to retain workpieces such as cables and the like joined to the base by a reversely bent section 102 so that the head is generally U shaped in cross section and is adapted to receive and retain various workpieces. Preferably, the clamping section 100 is formed inwardly toward the base as at 104 to provide a restricted mouth or opening 106 through which a workpiece may be snapped. The free end of the clamping section 100 is preferably flared outwardly as at 108 to facilitate assembly of the workpiece between the clamping section and the base.

The head portion 22 also includes an axially extending abutment portion 110 which is adapted to project into the panel aperture. The periphery of the abutment portion 110 preferably is substantially identical in size and shape to the size and shape of the panel aperture so that the abutment portion serves to locate the fastener within the aperture and also serves to absorb any shear stresses applied to the fastener.

In FIG. 3 there is shown a fastener member 20f which is similar to the embodiment of FIGS. 1 and 2 as indicated by the application of identical reference numerals with the suffix "f" added to corresponding elements except with the head portion 22f is modified. More specifically, the head portion 22f is provided with a pair of flexible clamping sections 112 and 114 which extend in opposite directions and are adapted to overlie the apertured panel 34f. Both of these clamping sections are formed so that they initially extend outwardly from the central head portion and then inwardly so that when the fastener member is applied to the panel, the clamping sections respectively provide restricted openings 116 and 118 in cooperation with the panel, through which openings workpieces such as an electric cable 120 may be snapped. In order to facilitate outward flexing of the clamping sections 112 and 114 during assembly therewith of a workpiece, the free ends of these sections are respectively flared outwardly as at 122 and 124. It will be appreciated that the clamping sections of the fastener member 20f might also be used for securing other workpieces than cables such, for example, as moulding strips, not shown, to the apertured panel.

FIG. 4 shows a fastener member 20g which is a modified form of the above described fastener member 20f as indicated by the application to corresponding elements of identical reference numerals with the suffix "g" added or substituted. This embodiment differs in that one of the flexible wing members of the shank has been eliminated by making it solid with the central shank portion and a shoulder 126 has been provided in the now solid shank portion to take the place of the end of the omitted flexible wing member. For some installations this modification simplifies assembly of the fastener member with the apertured panel since the shoulder 126 may first be hooked beneath the panel and then the assembly may be completed merely by pressing inwardly on the fastener until the wing member 38g snaps beneath the panel. The fact that there is only one resilient wing member assures proper alignment of the shank and the abutment portion 110g with the aperture of the panel at all times since the fastener is positively located within the aperture by the surface of the abutment means adjacent the shoulder 126.

FIG. 5 shows a fastener member 20h which incorporates modifications of the structures shown in FIGS. 1, 2 and 4 as indicated by the application to corresponding elements of identical reference numerals with the suffix "h" added or substituted. In this embodiment the means 110 or 110g of the above described embodiments has been omitted and has been replaced by a flange or abutment portion 128 on the flexible wing member 38h, which flange or abutment portion 128 is adapted to engage a side of the panel aperture. Thus, the fastener 20h may be especially useful when it is to be applied to apertures of varying sizes. As will be seen by referring to the drawings, the clamping section 100h is generally similar to the above described clamping section 100 except that the shape of the section 100h has been slightly modified to adapt it, especially for receiving a relatively large electric cable 120h.

FIG. 6 discloses still another modified form of the present invention which is essentially identical to the embodiment shown in FIGS. 1 and 2 as indicated by the application to corresponding elements of identical reference numerals with the suffix "i" added. The embodiment of FIG. 6 differs only in that the clamping section 100i is joined to the base 98i of the head portion along a relatively sharp corner section 130 and in that the base 98i is curved so that the concave side thereof faces the shank portion. The relatively sharp corner section 130 serves to stiffen the clamping section 100i for more aggressive and more positive engagement of the workpiece held thereby and the curved formation of the base 98i serves to insure that the ends of the flexible wing members 36i and 38i will always be resiliently urged into engagement with the apertured panel regardless of any slight variations in the thickness of the panel to which the fastener is applied.

From the above description it is seen that the present invention has provided a novel one piece plastic fastener or anchor member which fully satisfies the objects heretofore set forth. More specifically, it is seen that the present invention has provided a novel one piece plastic fastener member which may be easily snapped into assembled relationship with an apertured panel and which is adapted to be assembled with panels having various thicknesses and having apertures of various dimensions. It is also seen that the present invention has provided fastener members of relatively simple construction so that they may be economically made with simple split die means and without requiring an undue amount of stock material.

While the preferred embodiment of the present invention have been shown and described herein, it is obvious that many structural details may be changed without departing from the spirit and scope of the appended claims.

The invention is claimed as follows:

1. A one-piece plastic anchor member comprising a head portion interconnectable with a member, and an axially extending shank portion projecting from said head portion and adapted to be inserted through an aperture in a workpiece panel, said head portion including a section extending laterally from an integral junction with said shank portion for overlying one side of the panel and a securing member extending forwardly from said section for relatively connecting said anchor member and a part to be associated therewith, said shank portion including a centrally relatively rigid axially extending element having transverse dimensions less than corresponding dimensions of said aperture, resilient wing means, and abutment means adjacent said head portion and having a transverse dimension greater than a corresponding transverse dimension of said element for engagement with a wall of said panel aperture for restraining lateral shifting of the anchor member within the aperture, said resilient wing means comprising a wing member integrally connected with an entering end of said shank element and flaring from said entering end of the shank element and generally toward said head portion and in laterally spaced relationship to one side of said shank element for flexing inwardly toward said laterally spaced shank element during insertion of the shank portion through the apertured panel and then springing outwardly for engaging an opposite side of the panel and cooperating with the head portion to retain the anchor member in assembled relationship with the panel, said wing member including a panel engageable surface extending transversely thereof substantially at a free end thereof and facing said head portion and having a predetermined width in the direction of said flexing movement, and said free end of said wing member normally being spaced laterally outwardly from said one side of the shank element a distance similar to said predetermined width of said panel engageable surface so as to facilitate flexing of the wing member sufficiently to enable the panel engageable surface to be snapped beneath the panel.

2. A one piece plastic fastener, as defined in claim 1, wherein said shank element includes shoulder means on a side thereof opposite from said one side of the shank element and disposed for engaging said opposite side of the panel when the fastener member is assembled with the panel.

3. A one piece plastic fastener, as defined in claim 1, wherein said wing means includes a pair of oppositely disposed wing members integrally interconnected with opposite sides of an entering end portion of the shank element and flaring outwardly from and in laterally spaced relationship to said shank element.

4. A one piece plastic fastener, as defined in claim 1, wherein said abutment means comprises a rigid enlargement of the shank portion for engaging opposite sides of a panel aperture to positively locate the fastener within the aperture and to absorb any shear stresses applied to the fastener.

5. A one piece plastic fastener, as defined in claim 1, wherein said head portion securing member includes resilient extension means for clamping and retaining a workpiece.

6. A one piece plastic fastener, as defined in claim 5, wherein said resilient extension means projects generally laterally for overlying said one side of the panel and is looped away from and then generally toward said shank for clamping a workpiece against the panel.

7. A one piece plastic fastener, as defined in claim 5, wherein said head portion including said resilient extension means is in the form of a generally U-shaped clamp for securing between the legs thereof a workpiece.

8. A one piece plastic fastener, as defined in claim 7, wherein one leg of said generally U-shaped clamp is engageable with the panel, and a second leg of the generally U-shaped clamp is provided by said resilient extension means and is joined to said one leg by a relatively sharp corner section which serves to stiffen said second leg.

9. A one piece plastic fastener, as defined in claim 7, wherein one leg of said generally U-shaped clamp is engageable with the panel, and wherein said one leg is curved, with a concave side thereof facing toward the shank so that, upon application of the fastener to the panel, said one leg serves to resiliently draw said wing means against said opposite side of the panel.

References Cited in the file of this patent

UNITED STATES PATENTS

| | | |
|---|---|---|
| 1,236,458 | McDonald | Aug. 14, 1917 |
| 1,737,375 | King | Nov. 26, 1929 |
| 1,981,973 | Tinnerman | Nov. 27, 1934 |
| 1,998,791 | Schanz | Apr. 23, 1935 |
| 2,061,463 | Hall | Nov. 17, 1936 |
| 2,128,005 | Lombard | Aug. 23, 1938 |
| 2,318,853 | Hall | May 11, 1943 |

FOREIGN PATENTS

| | | |
|---|---|---|
| 26,555 | Great Britain | of 1896 |
| 364,492 | Great Britain | Jan. 7, 1932 |
| 599,050 | Great Britain | Mar. 3, 1948 |
| 845,808 | Germany | Aug. 4, 1952 |